(12) United States Patent
Wu

(10) Patent No.: US 9,910,631 B2
(45) Date of Patent: Mar. 6, 2018

(54) DISPLAY SCREEN, SPLICED DISPLAY SCREEN AND DRIVE METHOD FOR THE SAME

(71) Applicants: BOE Technology Group Co., Ltd., Beijing (CN); Beijing BOE Display Technology Co., Ltd., Beijing (CN)

(72) Inventor: Hailong Wu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/500,004

(22) Filed: Sep. 29, 2014

(65) Prior Publication Data
US 2015/0378663 A1    Dec. 31, 2015

(30) Foreign Application Priority Data

Jun. 26, 2014   (CN) .......................... 2014 1 0294224

(51) Int. Cl.
*G09G 3/34*          (2006.01)
*G06F 3/14*          (2006.01)
(Continued)

(52) U.S. Cl.
CPC .............. *G06F 3/1446* (2013.01); *G09G 3/38* (2013.01); *G02F 1/13336* (2013.01);
(Continued)

(58) Field of Classification Search
CPC ................................................ G09G 2300/026
See application file for complete search history.

(56) References Cited

U.S. PATENT DOCUMENTS

2005/0052349 A1*  3/2005  Kuczynski ............ G06F 1/1616
                                                   345/49
2005/0071969 A1*  4/2005  Sirringhaus ............ B82Y 30/00
                                                   29/4.51
(Continued)

FOREIGN PATENT DOCUMENTS

CN         101131799 A      2/2008
CN         202816272 U      3/2013

OTHER PUBLICATIONS

First Office Action, including Search Report, for Chinese Patent Application No. 201410294224.8, dated Jan. 26, 2016, 10 pages.

*Primary Examiner* — Carl Adams
(74) *Attorney, Agent, or Firm* — Westman, Champlin & Koehler, P.A.

(57) ABSTRACT

The present disclosure provides a display screen, comprising a non-display region which comprises at least one frame rim and a display region which comprises a plurality of pixels, wherein a plurality of regional units each provided with electrochromic material is formed on a surface of the frame rim, and, each of the regional units is configured to display a color corresponding to a color displayed on one of the pixels adjacent to the regional unit when the regional unit is supplied with a voltage associated with the color displayed on the one of the pixels adjacent to the regional unit during a displaying of a picture on the display screen. Meanwhile, the present disclosure also provides a spliced display screen consisted of a plurality of the abovementioned display screen, and a drive method for the abovementioned display screen.

17 Claims, 4 Drawing Sheets

(51) Int. Cl.
*G09G 3/38* (2006.01)
*G02F 1/1333* (2006.01)
*G02F 1/153* (2006.01)

(52) U.S. Cl.
CPC .............. *G02F 1/153* (2013.01); *G09G 3/34* (2013.01); *G09G 2300/026* (2013.01); *G09G 2310/0232* (2013.01); *G09G 2320/0233* (2013.01)

(56) References Cited

U.S. PATENT DOCUMENTS

| | | | |
|---|---|---|---|
| 2008/0246748 A1* | 10/2008 | Cassidy | G02F 1/13336 345/205 |
| 2010/0231603 A1* | 9/2010 | Kang | G09G 3/3426 345/591 |
| 2010/0259566 A1* | 10/2010 | Watanabe | G02B 3/08 345/690 |
| 2013/0176352 A1* | 7/2013 | Watanabe | G09G 3/34 345/690 |
| 2013/0235240 A1* | 9/2013 | Yoshida | H04N 5/378 348/302 |
| 2014/0168185 A1 | 6/2014 | Han et al. | |

* cited by examiner

DISPLAY SCREEN, SPLICED DISPLAY SCREEN AND DRIVE METHOD FOR THE SAME

CROSS-REFERENCE TO RELATED APPLICATION

This application claims the benefit of Chinese Patent Application No. 201410294224.8 filed on Jun. 26, 2014 in the State Intellectual Property Office of China, the whole disclosure of which is incorporated herein by reference.

BACKGROUND OF THE INVENTION

Field of the Invention

The present invention relates to display technology, and more particularly, to a display screen, a spliced display screen, and a drive method for the display screen.

Description of the Related Art

There is an increased demand for large-sized display screens, especially for outdoor display screens, in markets. However, manufacture of a large-sized display screen is constrained by the manufacture conditions such as size of glass substrate and techniques, which does not meet the demands in markets. Generally, a current solution is to splice a number of display screens into the large spliced display screen for displaying a complete picture. However, referring to FIG. 1, in a conventional spliced display screen, most of the frame rims among these display screens are black color or other deep color. Accordingly, there exist apparently visible seams among these display screens since every display screen has such a black color frame rim, thereby adversely affecting quality of the displayed picture. As a result, there is a need to minimize these seams or to make these seams invisible.

SUMMARY OF THE INVENTION

At least one object of the present invention is to provide a display screen, which is capable of harmonizing displayings of the pixels and their frame rims during the operation of the display screen, thereby improving a displaying effect of a complete picture displayed by a spliced display screen consisted of multiple such display screens.

Another object of the present invention is to provide a spliced display screen, which is capable of harmonizing displayings of the pixels and their frame rims during the operation of multiple display screens in such spliced display screen, thereby improving a displaying effect of a complete picture displayed by such spliced display screen.

Yet another object of the present invention is to provide a drive method for a display screen, which is capable of harmonizing displayings of the pixels and their frame rims during the operation of the display screen, thereby improving a displaying effect of a complete picture displayed by such display screen.

According to an embodiment of one aspect of the present invention, there is provided a display screen comprising a non-display region which comprises at least one frame rim and a display region which comprises a plurality of pixels, wherein a plurality of regional units each provided with electrochromic material is formed on a surface of the frame rim, and, each of the regional units is configured to display a color corresponding to a color displayed on one of the pixels adjacent to the regional unit when the regional unit is supplied with a voltage associated with the color displayed on the one of the pixels adjacent to the regional unit during a displaying of a picture on the display screen.

According to another embodiment of one aspect of the present invention, there is provided a spliced display screen comprising a plurality of abovementioned display screens.

According to yet another embodiment of one aspect of the present invention, there is provided a drive method for the abovementioned display screen, the drive method comprising the steps of:

S1) receiving a color displaying instruction for the one of the pixels adjacent to the regional unit, and, decoding the color displaying instruction to determine a target color for the one of the pixels adjacent to the regional unit; and S2) supplying, in accordance with the target color, the one of the pixels adjacent to the regional unit with a first voltage such that the one of the pixels adjacent to the regional unit displays the target color, and, the regional unit with a second voltage such that the regional unit displays a color corresponding to the target color.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
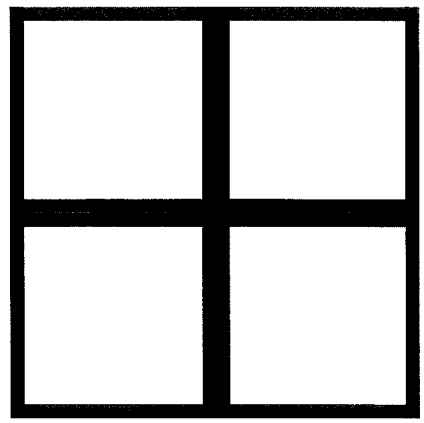
FIG. 1 is a schematic diagram of a conventional spliced display screen.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In accordance with a general inventive concept of the present invention, there is provided a display screen comprising a non-display region which comprises at least one frame rim and a display region which comprises a plurality of pixels, wherein a plurality of regional units each provided with electrochromic material is formed on a surface of the frame rim, and, each of the regional units is configured to display a color corresponding to a color displayed on one of the pixels adjacent to the regional unit when the regional unit is supplied with a voltage associated with the color displayed on the one of the pixels adjacent to the regional unit during a displaying of a picture on the display screen. In accordance with the embodiments of the present invention, with the provision of the regional units provided with electrochromic material on the display screen, the color displayed in the pixels adjacent to the frame rim is monitored in real-time during the displaying of a picture on the display screen, such that, once the voltage to the regional unit changes, the color displayed on the regional unit changes. In this manner, colors displayed on the pixels and colors of their frame rims adjacent thereto during the operation of multiple display screens in such spliced display screen are harmonized, thereby improving a displaying effect of a complete picture displayed by such spliced display screen. Meanwhile, there also provides a spliced display screen consisted of a plurality of the abovementioned display screen, and a drive method for the above-mentioned display screen.

Figure 2:
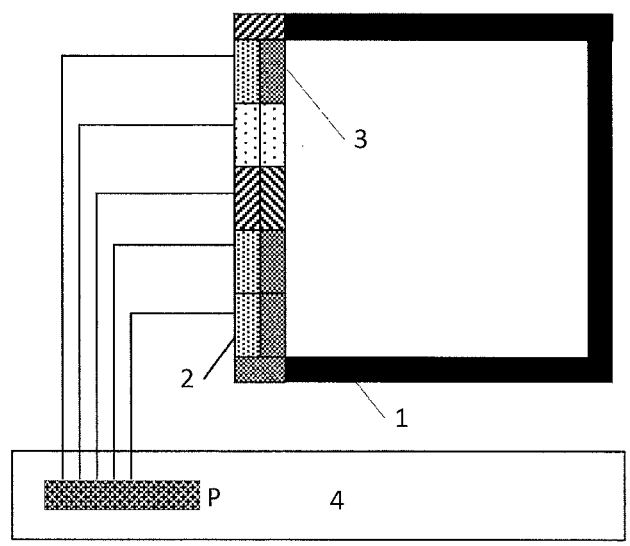
FIG. 2 is a structural schematic diagram of a display screen according to an embodiment of the present invention.

FIG. 2 is a structural schematic diagram of a display screen according to an embodiment of the present invention.

Referring to FIG. 2, according to an embodiment of the present invention, the display screen comprises a non-display region which comprises at least one frame rim 1 and a display region which comprises a plurality of pixels 3. A plurality of regional units 2 each provided with electrochromic material is formed on a surface of the frame rim 1. Each regional unit 2 is configured to display a color corresponding to a color displayed on one of the pixels 3 adjacent to the regional unit 2 when the regional unit 2 is supplied with a voltage associated with the color displayed on the one of the pixels 3 adjacent to the regional unit 2 during a displaying of a picture on the display screen. In this way, for the spliced display screen consisted of a printed circuit board 4 and a plurality of the abovementioned display screens, since a plurality of regional units 2 each provided with electrochromic material is arranged on a surface of the frame rim 1 of the display screen and each regional unit 2 has the same shape and size as each pixel 3. It should be mentioned that there may be a number of regional units 2 on every frame rim 1 of the display screen adjacent to other display screens in accordance with practical requirements, although the plurality of regional units 2 is only arranged on one frame rim 1 in this Figure. Since the regional unit 2 is provided with the electrochromic material, the regional unit 2 will emits a light of certain color once being supplied with a voltage of certain value. For example, if the electrochromic material is polyaniline, the regional unit 2 emits a bright yellow light once being supplied with a voltage of −0.2V, the regional unit 2 emits a green light once being supplied with a voltage of +0.5V, the regional unit 2 emits a dark blue light once being supplied with a voltage of +0.8V, and, the regional unit 2 is black once being supplied with a voltage of +1.0V. The switch time may be 10~120 ms.

In some embodiments of the present invention, the electrochromic material may comprise inorganic electrochromic material.

For example, the inorganic electrochromic material comprises any one or combination of a group comprising transition metal oxides, transition metal complex, prussian blue, and heteropolyacid.

In some embodiments of the present invention, the electrochromic material may comprise organic electrochromic material.

For example, the organic electrochromic material comprises organic cation salt, polyaniline, and/or, metal complex with organic ligand.

That is, the electrochromic material mentioned in the embodiments of the present invention comprises inorganic electrochromic material and/or organic electrochromic material, while, the inorganic electrochromic material mainly comprises any one or combination of a group comprising transition metal oxides, transition metal complex, prussian blue, and heteropolyacid, etc.; and, the organic electrochromic material mainly comprises organic cation salt and metal complex with organic ligand.

In some embodiments of the present invention, the surface of the frame rim where the regional units are formed is formed with insulation material, in order to prevent leakage of electricity.

In some embodiments of the present invention, the display screen further comprises a first voltage supplying unit 41 electrically connected to the pixels 3 in the display region and configured to supply the pixels 3 in the display region with a voltage and a second voltage supplying unit 42 electrically connected to the regional units 2 and configured to supply the regional units 2 with a voltage.

In some embodiments of the present invention, the display screen further comprises a main chip 40 electrically connected to the first voltage supplying unit 41 and the second voltage supplying unit 42, respectively, and, an analogue-to-digital conversion unit 5 electrically connected to the main chip 40 and configured for receiving a color displaying instruction for the one of the pixels 3 adjacent to the regional unit 2 and transferring the received color displaying instruction to the main chip 40. The main chip 40 is configured to decode the color displaying instruction to determine a target color for the one of the pixels 3 adjacent to the regional unit 2. In accordance with the color displaying instruction, the main chip 40 controls the first voltage supplying unit 41 to supply the one of the pixels 3 adjacent to the regional unit 2 with a first voltage such that the one of the pixels 3 adjacent to the regional unit 2 displays the target color, and controls the second voltage supplying unit 42 to supply the regional unit 2 with a second voltage such that the regional unit 2 displays a color corresponding to the target color.

The regional units 2 may be electrically connected to the pins on the voltage supplying unit P of the printed circuit board 4 by metal wires. The voltage supplying unit is preferably a direct current voltage conversion unit (DC-DC) and is used to supply the regional units 2 with voltage. When a data voltage is transferred to the pixel 3 adjacent to the regional unit 2 on the frame rim, a voltage used for displaying of the corresponding regional unit 2 with same color or corresponding color (that is, degree of the difference between the target color displayed on the pixel 3 adjacent to the corresponding regional unit 2 and the color displayed on this regional unit 2 is within a preset range) is transferred to the regional unit 2 through the voltage supplying unit. In order to transfer synchronously the correct voltage to the regional unit 2 when supplying the pixel 3 adjacent to the regional unit 2 with the data voltage, in one exemplary embodiment of the present invention, a function of controlling the regional unit 2 on the frame rim is added to the data control chip on the printed circuit board 4; while, in another exemplary embodiment of the present invention, a control chip (i.e., the main chip 40) for the regional unit 2 is added.

Figure 3:
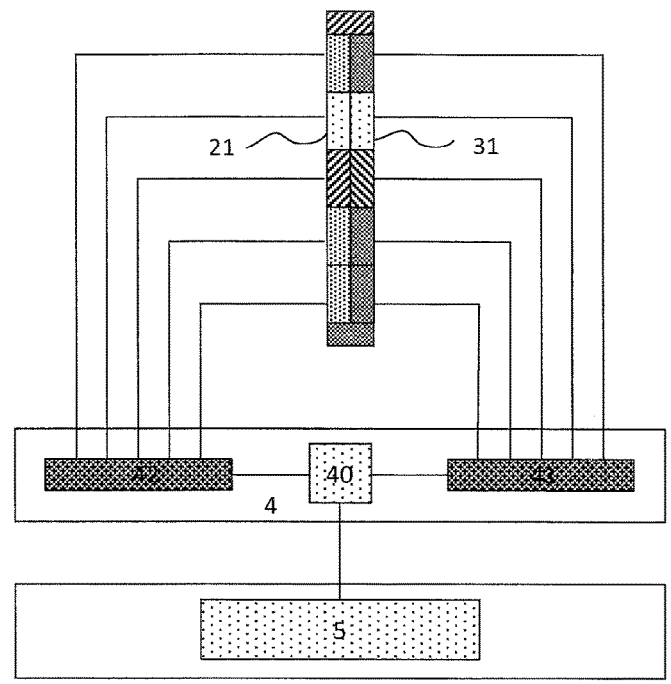
FIG. 3 is a synchronous circuit diagram of a frame rim and pixels in a display screen according to another embodiment of the present invention.

Referring to FIG. 3, take a 32 inch display screen as an example, if it is supposed to display green on the first pixel 31, the analogue-to-digital conversion unit (AD-Board) 5 receives an instruction for displaying green on the first pixel 31 and transfers this instruction to the main chip 40. After decoding this instruction, the main chip 40, on one hand, sends an signal to the first voltage supplying unit 41 such that the first voltage supplying unit 41 supplies a voltage of 7V to the first pixel 31 through the metal wire, thereby driving the liquid crystal to deflect and thus displaying green on the first pixel 31; on the other hand, sends another signal to the second voltage supplying unit 42 such that the second voltage supplying unit 42 supplies a certain voltage of 0.5V to the first regional unit 21 corresponding to the first pixel 31 through the metal wire, thereby displaying green on the first regional unit 21. In this way, synchronous displaying of a color on the first pixel 31 and a corresponding color on the first regional unit 21 is achieved. Similarly, all the regional units 2 on the frame rim can synchronously display the color corresponding to that displayed on the pixels 3 adjacent thereto.

Figure 4:
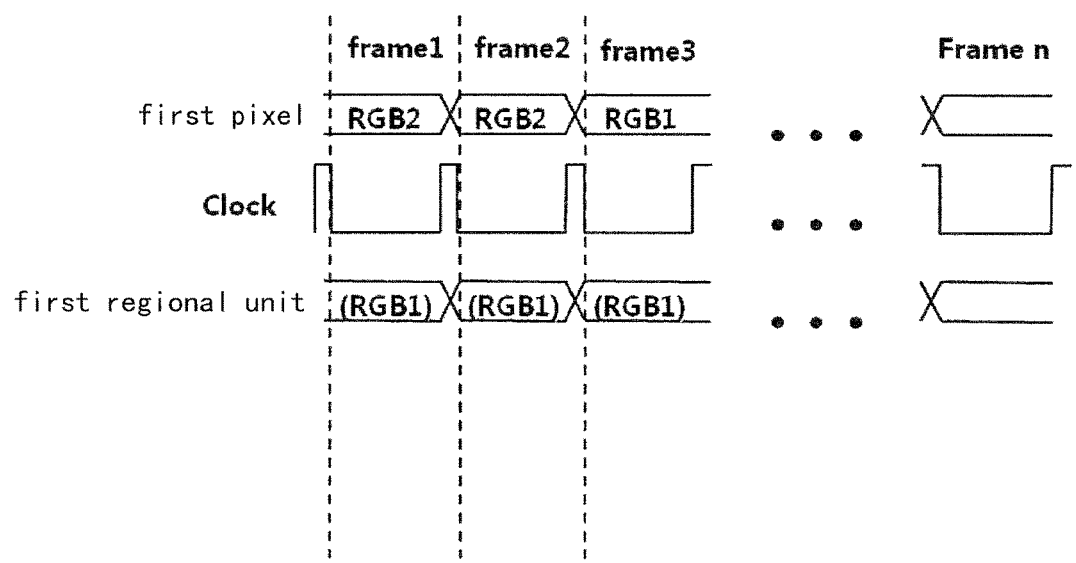
FIG. 4 is a data stream per frame diagram of a first pixel and a first regional unit according to an embodiment of the present invention.

FIG. 4 shows a specific process of operation of the electric circuit. When a first clock is arrived at the main chip 40, the display starts to display a first frame of picture and the main chip 40 transfers a voltage signal for the pixel to the first voltage supplying unit 41, and the main chip 40 transfers a voltage signal for the corresponding regional unit 2 to the second voltage supplying unit 42 synchronously. When the next clock is arrived, the display starts to display a second frame of picture, by the same way, the similar signals are transferred to the first voltage supplying unit 41 and the second voltage supplying unit 42, respectively. In this manner, during the displaying of each frame of picture, the main chip 40 controls the first voltage supplying unit 41 to supply each of these pixels 3 adjacent to the regional units 2 with one voltage while controlling the second voltage supplying unit 42 to supply each of these regional units 2 with another voltage (which is determined by the main chip 40 based on the target color required to be displayed on the corresponding pixel 3 adjacent to the regional units 2). As a result, the colors displayed on the regional units 2 and those displayed on the pixels 3 adjacent to the regional units 2 are the same or harmonized.

In some embodiments of the present invention, the display screen may further comprise a voltage latch L provided between the regional unit 2 and a pin of the second voltage supplying unit 42 and configured to remain a voltage to the regional unit 2 unchanged when no control instruction is transferred from the main chip 40 to the second voltage supplying unit 42.

Figure 5:
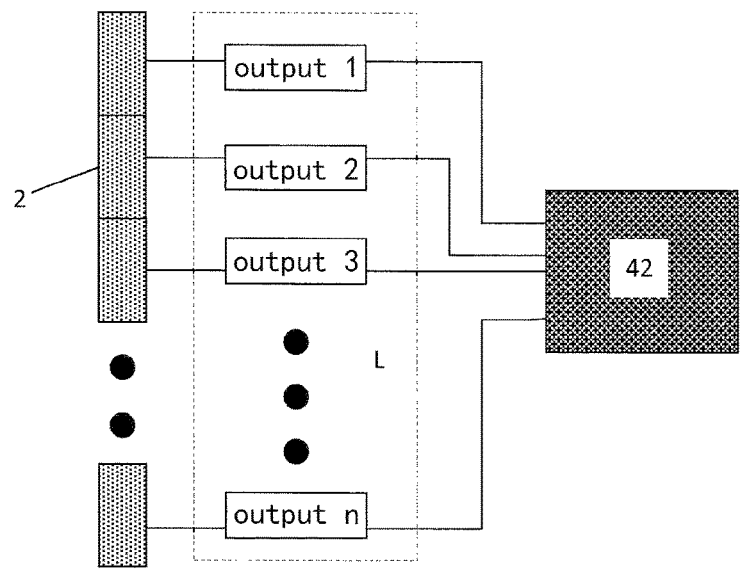
FIG. 5 is a circuit block diagram of a latch between a frame rim and DC-DC according to an embodiment of the present invention.

As shown in FIG. 5, an output voltage latch L may be added between the regional unit 2 and the pin of the second voltage supplying unit 42, depending on practical technical requirements. The voltage latch L remains the voltage to the regional unit 2 unchanged until a new voltage reaches.

Figure 6:
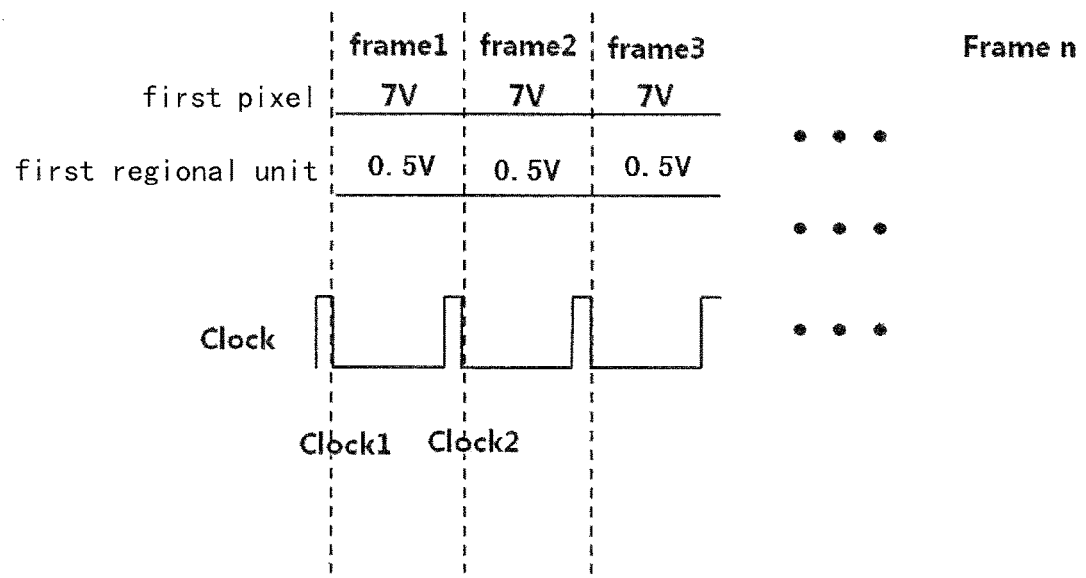
FIG. 6 is a diagram for voltage per frame between a first pixel and a first regional unit according to an embodiment of the present invention.

FIG. 6 shows a diagram for a practical voltage signal transmission. From a first clock (Clock1), the display starts to display a first frame of picture and the main chip 40 controls the first voltage supplying unit 41 to supply the pixel 3 adjacent to the regional unit 2 with a voltage of 7V and also controls the second voltage supplying unit 42 to supply the regional unit 2 with a voltage of 0.5V, such that both the pixel 3 adjacent to the regional unit 2 and the regional unit 2 display green simultaneously. If it is supposed to maintain the green displaying during a next frame, from a second clock (Clock2), the display starts to display a second frame of picture and the main chip 40 controls the first voltage supplying unit 41 to supply the pixel 3 with a voltage of 7V and also controls the second voltage supplying unit 42 to supply the regional unit 2 with a voltage of 0.5V, such that both the pixel 3 adjacent to the regional unit 2 and the regional unit 2 continue to display green. In this manner, the color displayed on the regional unit 2 and that displayed on the pixel 3 adjacent to the regional unit 2 are always the same during displaying of each frame of picture.

Figure 7:
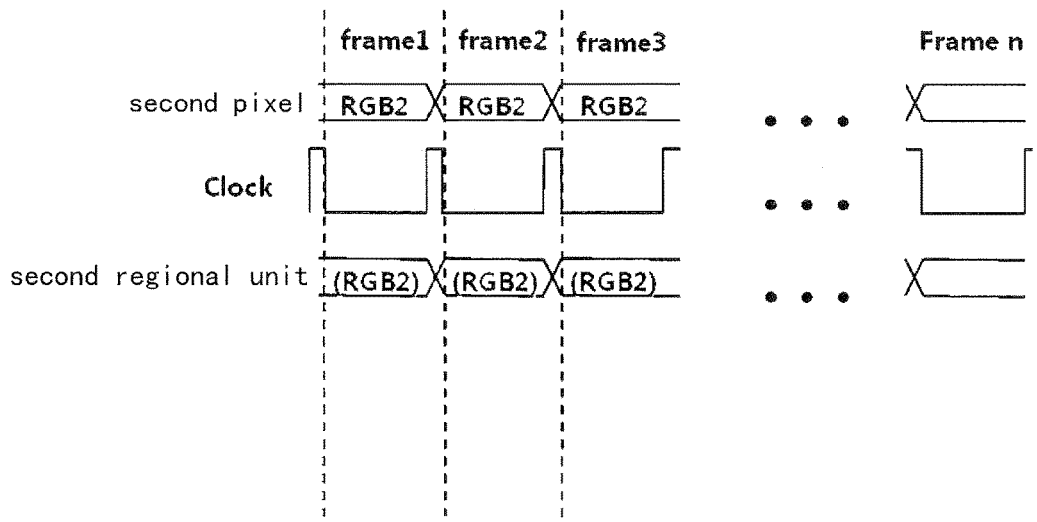
FIG. 7 is a diagram for data stream per frame between a first pixel and a first regional unit according to another embodiment of the present invention.

For example, FIG. 7 shows a process of color displaying on another regional unit (e.g., a next regional unit adjacent to the abovementioned regional unit 2 shown in FIG. 6), correspondingly, the pixel is a next pixel adjacent to the abovementioned pixel 3. In order to distinguish one from another, the regional unit and the pixel in FIG. 6 are named as the first regional unit and the first pixel, while, the regional unit and the pixel in FIG. 7 are named as the second regional unit and the second pixel. Since the process of color displaying in FIG. 7 is the same as that in FIG. 6, explanations and interpretations on this is omitted.

In the display screen according to embodiments of the present invention, since the electrochromic material is used in the frame rim so that the regional units 2 on the frame rim are controlled by the chip to display the color the same as or similar to that of the pixels 3 adjacent to the regional units 2, displayings of the pixels and their frame rims during the operation of the display screen are harmonized, thereby improving a displaying effect of a complete picture displayed by such spliced display screen.

According to an embodiment of the present invention, there is provided a spliced display screen comprising a plurality of abovementioned display screens.

Display devices comprising the abovementioned spliced display screen according to the embodiments of the present invention may be any products or components having a displaying function, such as, electronic paper, mobile phone, tablet PC, TV, display, notebook PC, digit photo frame, navigating instrument, etc.

In order to manufacture the abovementioned frame rim, the following method can be taken. First of all, to mount an original frame rim on a specified position. Then, to deposit electrochromic material on the frame rim by Plasma Enhanced Chemical Vapor Deposition (PECVD). Here, in these embodiments of the present invention, the electrochromic material may comprise inorganic electrochromic material and organic electrochromic material; the inorganic electrochromic material mainly comprises transition metal oxides, transition metal complex, prussian blue, and heteropolyacid, etc.; and, the organic electrochromic material mainly comprises organic cation salt, and, metal complex with organic ligand. In an exemplary embodiment, it is a polyaniline film. In another embodiment, if the metal electrochromic material is used, a target sputtering method should be used. Next, a mask for color film substrate is used as the mask in the present invention to perform an exposure step on the electrochromic material, after that, to perform the steps of developing, etching, etc., so as to obtain a regional unit 2 of specified shape. Then, to manufacture a metal film by performing a target sputtering method on the surface of the regional unit 2, to perform a step of exposing by the mask, and, to perform the steps of developing and etching so as to obtain a metal wire for supplying the regional unit 2 with electric voltage. Finally, to coat a layer of insulation material on the outer surface of the frame rim in order to prevent leakage of electricity.

With the abovementioned manufacture method, the mask for color film substrate is used as the mask in the present invention, which simplifies the manufacturing process and reduces the manufacturing cost.

Figure 8:
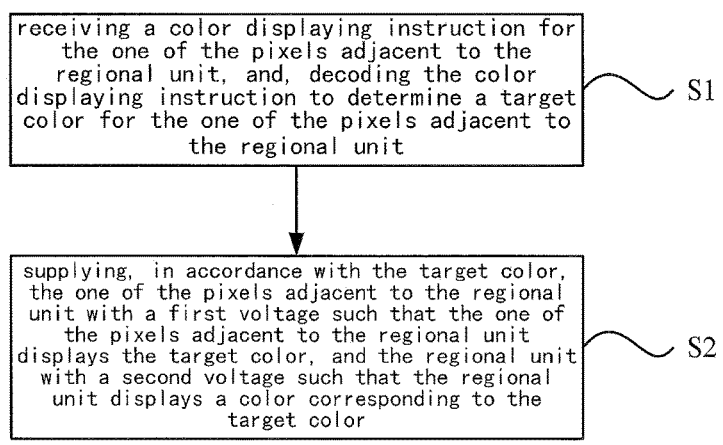
FIG. 8 is a flow diagram of a drive method for a display screen according to an embodiment of the present invention.

Referring to FIG. 8, the present invention also provides a drive method for the abovementioned display screen. The drive method comprises: S1) receiving a color displaying instruction for the one of the pixels adjacent to the regional unit, and, decoding the color displaying instruction to determine a target color for the one of the pixels adjacent to the regional unit; and; S2) supplying, in accordance with the target color, the one of the pixels adjacent to the regional unit with a first voltage such that the one of the pixels adjacent to the regional unit displays the target color, and the regional unit with a second voltage such that the regional unit displays a color corresponding to the target color.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display screen, comprising a non-display region which comprises at least one frame rim and a display region which comprises a plurality of pixels, wherein a plurality of regional units is formed on a surface of the frame rim within the non-display region, and, each of the regional units formed on the surface of the frame rim within the non-display region includes electrochromic material, and each of the regional units is configured to display a color that matches a color displayed on one of the pixels adjacent to the regional unit when the regional unit is supplied with a voltage associated with the color displayed on the one of the pixels adjacent to the regional unit during a displaying of a picture on the display screen, wherein each regional unit in the non-display region has the same shape and size as each pixel in the display region.

2. The display screen according to claim 1, further comprising a first voltage supplying unit electrically connected to the pixels in the display region and configured to supply the pixels in the display region with a voltage and a second voltage supplying unit electrically connected to the regional units and configured to supply the regional units with a voltage.

3. The display screen according to claim 2, further comprising a main chip electrically connected to the first voltage supplying unit and the second voltage supplying unit, respectively, and, an analogue-to-digital conversion unit electrically connected to the main chip and configured for receiving a color displaying instruction for the one of the pixels adjacent to the regional unit and transferring the received color displaying instruction to the main chip; wherein the main chip is configured to decode the color displaying instruction to determine a target color for the one of the pixels adjacent to the regional unit; wherein, in accordance with the color displaying instruction, the main chip controls the first voltage supplying unit to supply the one of the pixels adjacent to the regional unit with a first voltage such that the one of the pixels adjacent to the regional unit displays the target color, and controls the second voltage supplying unit to supply the regional unit with a second voltage such that the regional unit displays a color corresponding to the target color.

4. The display screen according to claim 3, further comprising a voltage latch provided between the regional unit and a pin of the second voltage supplying unit and configured to remain a voltage to the regional unit unchanged when no control instruction is transferred from the main chip to the second voltage supplying unit.

5. The display screen according to claim 1, wherein the surface of the frame rim where the regional units are formed is formed with insulation material.

6. The display screen according to claim 5, wherein the electrochromic material comprises inorganic electrochromic material.

7. The display screen according to claim 6, wherein the inorganic electrochromic material comprises any one or combination of a group comprising transition metal oxides, transition metal complex, prussian blue, and heteropolyacid.

8. The display screen according to claim 5, wherein the electrochromic material comprises organic electrochromic material.

9. The display screen according to claim 8, wherein the organic electrochromic material comprises organic cation salt, polyaniline, and/or, metal complex with organic ligand.

10. A spliced display screen comprising a plurality of display screens according to claim 9.

11. A drive method for a display screen according to claim 9, the drive method comprising the steps of:
    S1) receiving a color displaying instruction for the one of the pixels adjacent to the regional unit, and, decoding the color displaying instruction to determine a target color for the one of the pixels adjacent to the regional unit; and
    S2) supplying, in accordance with the target color, the one of the pixels adjacent to the regional unit with a first voltage such that the one of the pixels adjacent to the regional unit displays the target color, and the regional unit with a second voltage such that the regional unit displays a color corresponding to the target color.

12. The display screen according to claim 1, wherein the electrochromic material comprises inorganic electrochromic material.

13. The display screen according to claim 12, wherein the inorganic electrochromic material comprises any one or combination of a group comprising transition metal oxides, transition metal complex, prussian blue, and heteropolyacid.

14. The display screen according to claim 1, wherein the electrochromic material comprises organic electrochromic material.

15. The display screen according to claim 14, wherein the organic electrochromic material comprises organic cation salt, polyaniline, and/or, metal complex with organic ligand.

16. A spliced display screen comprising a plurality of display screens according to claim 1.

17. A drive method for a display screen according to claim 1, the drive method comprising the steps of:
    S1) receiving a color displaying instruction for the one of the pixels adjacent to the regional unit, and, decoding the color displaying instruction to determine a target color for the one of the pixels adjacent to the regional unit; and
    S2) supplying, in accordance with the target color, the one of the pixels adjacent to the regional unit with a first voltage such that the one of the pixels adjacent to the regional unit displays the target color, and the regional unit with a second voltage such that the regional unit displays a color corresponding to the target color.

* * * * *